(12) United States Patent
Uchiyama

(10) Patent No.: US 10,805,280 B2
(45) Date of Patent: Oct. 13, 2020

(54) SERVICE PROVIDING SYSTEM CONFIGURED TO MANAGE A DEFAULT PROFILE, SERVICE PROVIDING APPARATUS, AND SERVICE PROVIDING METHOD

(71) Applicant: Daigo Uchiyama, Tokyo (JP)

(72) Inventor: Daigo Uchiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 292 days.

(21) Appl. No.: 15/475,909

(22) Filed: Mar. 31, 2017

(65) Prior Publication Data

US 2017/0331799 A1    Nov. 16, 2017

(30) Foreign Application Priority Data

May 12, 2016   (JP) .................................. 2016-096496

(51) Int. Cl.
*H04W 12/06* (2009.01)
*H04L 29/06* (2006.01)
*H04L 29/08* (2006.01)

(52) U.S. Cl.
CPC .............. *H04L 63/06* (2013.01); *H04L 63/08* (2013.01); *H04L 63/0815* (2013.01); *H04L 63/10* (2013.01); *H04W 12/06* (2013.01); *H04L 67/16* (2013.01)

(58) Field of Classification Search
CPC ..... H04L 63/06; H04L 63/08; H04L 63/0815; H04L 63/10; H04W 12/06
USPC .......................................................... 726/4
See application file for complete search history.

(56) References Cited

U.S. PATENT DOCUMENTS

| | | | | |
|---|---|---|---|---|
| 6,684,248 B1 * | 1/2004 | Janacek | ................ | H04L 63/12 709/217 |
| 6,781,972 B1 * | 8/2004 | Anderlind | ............... | H04L 51/12 370/329 |
| 7,810,136 B2 * | 10/2010 | Guo | ........................ | H04L 63/08 701/533 |
| 8,104,057 B2 * | 1/2012 | Lee | ........................ | H04N 5/445 713/183 |

(Continued)

FOREIGN PATENT DOCUMENTS

| | | |
|---|---|---|
| JP | 2007-293654 | 11/2007 |
| JP | 2014-095986 | 5/2014 |
| WO | WO2003/104947 A2 | 12/2003 |

*Primary Examiner* — Farid Homayounmehr
*Assistant Examiner* — Thanh T Le
(74) *Attorney, Agent, or Firm* — Harness, Dickey & Pierce P.L.C.

(57) ABSTRACT

A service providing system includes a login information publishing apparatus that publishes login information when a user logs in the login information publishing apparatus and a service providing apparatus that provides service to the user based on the login information being published. The service providing apparatus includes circuitry that manages the login information being published and setting information used when the user utilizes the service being provided, associated with an account created for the user to utilize the service being provided and manages the login information being published associated with default setting information, the default setting information being the setting information that is firstly applied when the user utilizes the service based on the login information being published.

13 Claims, 12 Drawing Sheets

(56) References Cited

U.S. PATENT DOCUMENTS

| | | | | |
|---|---|---|---|---|
| 8,294,925 B2* | 10/2012 | Vidyanand | ............ | G06F 3/1204 358/1.1 |
| 8,327,428 B2* | 12/2012 | Bailey | ................ | G06F 21/41 726/8 |
| 8,539,046 B2* | 9/2013 | Gillett | ................ | G06Q 10/107 709/218 |
| 8,879,099 B2* | 11/2014 | Mogaki | ................ | G06F 21/608 358/1.14 |
| 9,203,829 B1* | 12/2015 | Levine | ................ | H04L 63/0815 |
| 2002/0083012 A1* | 6/2002 | Bush | ................ | H04L 63/10 705/76 |
| 2003/0121007 A1* | 6/2003 | Coleman | ............ | G06K 15/1807 715/210 |
| 2003/0149781 A1* | 8/2003 | Yared | ................ | H04L 63/0815 709/229 |
| 2003/0204610 A1* | 10/2003 | Howard | ............ | H04L 63/0815 709/229 |
| 2005/0005133 A1* | 1/2005 | Xia | ................ | H04L 63/0807 713/185 |
| 2006/0077438 A1* | 4/2006 | Lovat | ................ | G06F 21/84 358/1.15 |
| 2007/0104182 A1* | 5/2007 | Gorti | ................ | H04L 67/306 370/352 |
| 2007/0130343 A1* | 6/2007 | Pardo-Blazquez | ... | H04L 63/168 709/227 |
| 2007/0183002 A1* | 8/2007 | Corona | ................ | H04N 1/00811 358/474 |
| 2007/0255652 A1* | 11/2007 | Tumminaro | ............ | G06Q 30/06 705/39 |
| 2008/0297829 A1* | 12/2008 | Paek | ................ | H04N 1/4413 358/1.15 |
| 2009/0248632 A1* | 10/2009 | Subramanian | ............ | H04N 1/34 |
| 2009/0271847 A1* | 10/2009 | Karjala | ................ | H04L 9/3226 726/6 |
| 2010/0071056 A1* | 3/2010 | Cheng | ................ | H04L 63/0815 726/16 |
| 2010/0211885 A1* | 8/2010 | Berg | ................ | G06F 40/186 715/745 |
| 2010/0275009 A1* | 10/2010 | Canard | ................ | H04L 63/0823 713/155 |
| 2011/0093577 A1* | 4/2011 | Lee | ................ | H04L 41/00 709/223 |
| 2011/0167476 A1* | 7/2011 | Takenouchi | ............ | G06Q 30/02 726/3 |
| 2011/0173427 A1* | 7/2011 | Merkin | ................ | G06F 9/4451 713/2 |
| 2011/0196978 A1* | 8/2011 | Toyama | ................ | H04L 67/22 709/229 |
| 2011/0213842 A1* | 9/2011 | Takenouchi | ............ | G06Q 30/02 709/206 |
| 2011/0238737 A1* | 9/2011 | Agrawal | ................ | G06F 9/5072 709/203 |
| 2012/0278759 A1* | 11/2012 | Curl | ................ | G06F 19/3418 715/804 |
| 2013/0047247 A1* | 2/2013 | Matsuda | ................ | G06F 21/335 726/9 |
| 2013/0091171 A1* | 4/2013 | Lee | ................ | G06F 21/41 707/784 |
| 2013/0246777 A1* | 9/2013 | Fukasawa | ............ | G06F 9/4401 713/1 |
| 2013/0326608 A1* | 12/2013 | Uchida | ................ | H04L 63/0815 726/8 |
| 2014/0129607 A1 | 5/2014 | Nagumo | | |
| 2014/0201366 A1* | 7/2014 | Kamp | ................ | G06F 21/335 709/225 |
| 2014/0282807 A1* | 9/2014 | Joseph | ................ | H04L 65/4076 725/132 |
| 2015/0020092 A1* | 1/2015 | Singal | ................ | H04N 21/4753 725/30 |
| 2015/0067805 A1* | 3/2015 | Martin | ................ | H04L 67/1095 726/7 |
| 2015/0178496 A1* | 6/2015 | Kohlenberg | ........ | H04L 63/1433 726/23 |
| 2016/0156607 A1* | 6/2016 | Kim | ................ | H04W 12/06 726/7 |
| 2016/0232600 A1* | 8/2016 | Purves | ................ | G06Q 20/3223 |
| 2016/0359774 A1* | 12/2016 | Beardow | ................ | H04L 51/28 |

* cited by examiner

| ATTRIBUTE | ATTRIBUTE VALUE |
|---|---|
| EXPIRATION DATE/TIME | 2016/01/28 19:02 |
| ISSUE DATE/TIME | 2016/01/28 18:02 |
| ISSUE TARGET | aa-service |
| ISSUE SOURCE | IdP_C |
| AUTHORITY | openid profile e-mail phone |
| USER ID | ****** |

| LOGIN ID | ACCOUNT ID |
|---|---|
| user1@IdP_A | 1251 |
| user2@IdP_C | |
| user3@IdP_B | |
| user4@IdP_C | 1252 |
| user5@IdP_F | |
| ⋮ | ⋮ |

FIG. 7

| PROFILE ID | ACCOUNT ID |
|---|---|
| pf-1251-0001 | 1251 |
| pf-1251-0002 | |
| pf-1251-0003 | |
| pf-1252-0001 | 1252 |
| pf-1252-0002 | |
| ⋮ | ⋮ |

FIG. 8

| LOGIN ID | PROFILE ID (DEFAULT) |
|---|---|
| user1@IdP_A | pf-1251-0002 |
| user2@IdP_C | pf-1251-0003 |
| user3@IdP_B | pf-1251-0001 |
| user4@IdP_C | pf-1252-0002 |
| user5@IdP_F | pf-1252-0001 |
| ⋮ | ⋮ |

FIG. 9

| ATTRIBUTE | ATTRIBUTE VALUE |
|---|---|
| PROFILE ID | pf-1251-0003 |
| PROFILE NAME | FOR BUSINESS USE |
| NAME | ****** |
| E-MAIL ADDRESS | ******@example.com |
| LANGUAGE | JAPANESE |
| TIME ZONE | +9:00 |
| GROUP WHICH USER BELONGS TO AND ROLE | DEVELOP PRODUCT A : MANAGER<br>USER WHO RESIDES IN BUILDING C : GENERAL USER<br>USER OF TRAINING CENTER : GENERAL USER |
| LAST UPDATE DATE/TIME | 2016/01/28 17:36 |

FIG. 15

| SELECTION SCREEN (ACCOUNT ID) | ✕ |

PLEASE SELECT IdP SERVICE THAT YOU HAVE UTILIZED BEFORE FROM LIST SHOWN BELOW AND LOG IN.

- LOG IN WITH IdP_A
- LOG IN WITH IdP_E
- LOG IN WITH IdP_B
- LOG IN WITH IdP_F
- LOG IN WITH IdP_C
- LOG IN WITH IdP_G
- LOG IN WITH IdP_D
- LOG IN WITH IdP_H

BACK ◀ ▶ NEXT
1/2

IF YOU HAVE NOT UTILIZED ANY ONE OF IdP SERVICES SHOW ABOVE YET OR WANT TO CREATE NEW ACCOUNT WHILE YOU HAVE UTILIZED IdP SERVICE SHOWN ABOVE BEFORE, PLEASE PRESS BUTTON SHOWN BELOW.

CREATE NEW ACCOUNT

FIG. 16

| SELECTION SCREEN (PROFILE ID) | ✕ |

PLEASE SELECT PROFILE APPLIED AS DEFAULT IN CASE OF LOGGING IN WITH THIS USER ID AMONG LIST (EXISTING PROFILE) SHOWN BELOW.

| FOR BUSINESS USE 1 | FOR GENERAL USER 1 |
| FOR BUSINESS USE 2 | FOR GENERAL USER 2 |
| FOR PERSONAL USE 1 | FOR MANAGER 1 |
| FOR PERSONAL USE 2 | FOR MANAGER 2 |

BACK ◀ ▶ NEXT
1/1

IF YOU WANT TO CREATE NEW PROFILE APPLIED AS DEFAULT IN CASE OF LOGGING IN WITH THIS USER ID, PLEASE PRESS BUTTON SHOWN BELOW.

CREATE NEW PROFILE

FIG. 17

| FOR BUSINESS USE 1 ▼ |
|---|
| FOR BUSINESS USE 2 |
| FOR PERSONAL USE 1 |
| FOR PERSONAL USE 2 |
| FOR GENERAL USER 1 |
| FOR GENERAL USER 2 |
| FOR MANAGER 1 |
| FOR MANAGER 2 |

FIG. 18

ACCOUNT ID : 1251

| LOGIN ID | SWITCHABLE PROFILE ID |
|---|---|
| user1@IdP_A | pf-1251-0001, pf-1251-0002, pf-1251-0003 |
| user2@IdP_C | pf-1251-0003 |
| user3@IdP_B | pf-1251-0001, pf-1251-0002 |

ACCOUNT ID : 1252

| LOGIN ID | SWITCHABLE PROFILE ID |
|---|---|
| user4@IdP_C | pf-1252-0001, pf-1252-0002 |
| user5@IdP_F | pf-1252-0001 |

# SERVICE PROVIDING SYSTEM CONFIGURED TO MANAGE A DEFAULT PROFILE, SERVICE PROVIDING APPARATUS, AND SERVICE PROVIDING METHOD

CROSS-REFERENCE TO RELATED APPLICATION

This patent application is based on and claims priority pursuant to 35 U.S.C. § 119(a) to Japanese Patent Application No. 2016-096496, filed on May 12, 2016 in the Japan Patent Office, the entire disclosure of which is hereby incorporated by reference herein.

BACKGROUND

Technical Field

The present invention relates to a service providing system, a service providing apparatus, and a service providing method.

Background Art

Various services via networks such as printing services, web storage services, and net mail-order services (hereinafter referred to as "cloud services") have been provided recently. In order to utilize these cloud services, users need to create user IDs for each of those cloud services respectively.

In this case, users need to manage their user IDs for each of the cloud services respectively. To cope with this issue, as typified by OAuth and Open ID Connect (OIDC) etc. utilized in social networking services mainly, a technology that can utilize a user ID issued by an ID provider of a cloud service (hereinafter referred to as "identity provider (IdP)") as his/her own user ID (hereinafter referred to as "IdP using service") has been proposed and known.

In the IdP using service described above, the same user ID issued by the IdP may be utilized for using multiple services. Therefore, it is unnecessary for users to manage their user IDs for each of cloud services, enhancing user convenience.

In some cases, in the cloud service described above, a user wants to switch his/her profile such as switching settings and access authorities in accordance with usage and switching the user's existence on the network etc.

To satisfy such demand, a technology that user creates user IDs for each profile in the IdP using service and logs in the IdP using service anew each time the user switches the profile has already been known.

In other case, in the IdP using service, a technology that a user creates multiple profiles corresponding to one user ID and switches multiple profiles for one login has also been known already.

SUMMARY

Example embodiments of the present invention provide a novel service providing system that includes a login information publishing apparatus that publishes login information when a user logs in the login information publishing apparatus and a service providing apparatus that provides service to the user based on the login information being published. The service providing apparatus includes circuitry that manages the login information being published and setting information used when the user utilizes the service being provided, associated with an account created for the user to utilize the service being provided and manages the login information being published associated with default setting information, the default setting information being the setting information that is firstly applied when the user utilizes the service based on the login information being published.

Further example embodiments of the present invention provide a service providing apparatus, and a method of providing service.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 7 is a diagram illustrating a data structure of a profile ID management table stored in an account storing unit as an embodiment of the present invention;

FIG. 8 is a diagram illustrating a data structure of a default profile ID management table stored in an account storing unit as an embodiment of the present invention;

FIG. 9 is a diagram illustrating a data structure of a profile managed by a profile manager as an embodiment of the present invention;

FIG. 15 is a diagram illustrating a selection screen (account ID) being displayed on the user terminal as an embodiment of the present invention;

FIG. 16 is a diagram illustrating a selection screen (profile ID) being displayed on the user terminal as an embodiment of the present invention;

FIG. 17 is a diagram illustrating a profile switching screen being displayed on the user terminal as an embodiment of the present invention, and FIG. 18 is a diagram illustrating a data structure of a switchable profile management table stored in an account storing unit as an embodiment of the present invention.

Figure 1:
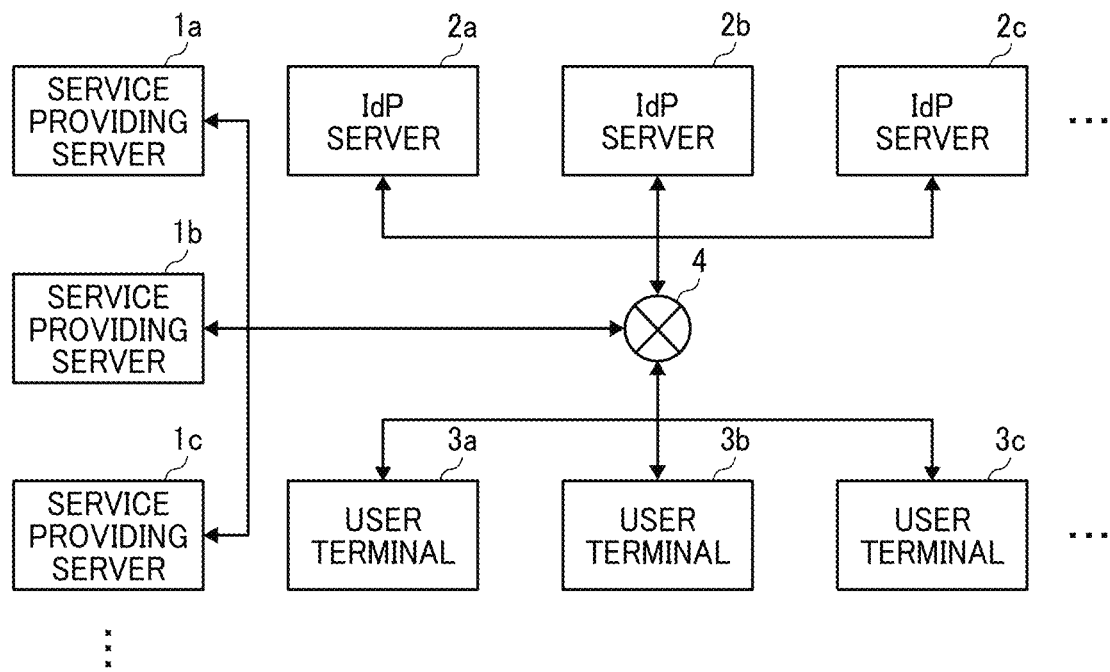
FIG. 1 is a diagram illustrating a service providing system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In this embodiment, a service providing system that provides various services via networks such as printing services, web storage services, and net mail-order services (hereinafter referred to as "cloud services") is described below.

In the service providing system in this embodiment, as typified by OAuth and Open ID Connect (OIDC) etc. utilized in social networking services (SNSs) mainly, a technology that can utilize a user ID issued by an ID provider of a cloud service (hereinafter referred to as "identity provider (IdP)") as his/her own user ID (hereinafter referred to as "IdP using service") may be provided.

In some cases, in the service providing system described above, a user wants to switch his/her profile such as switching settings and access authorities in accordance with usage and switching the user's existence on the network etc.

The service providing system described above allows a user to easily select a profile to be used, while preventing the user from selecting a profile different from the intended profile by mistake. As a result, in the service providing system in this embodiment, it is possible to enhance user convenience of the IdP using service.

First, operation of a service providing system in this embodiment is described below with reference to FIG. 1. FIG. 1 is a diagram illustrating a service providing system in this embodiment.

As illustrated in FIG. 1, in the service providing system in this embodiment, multiple service providing servers 1a, 1b, and 1c, multiple IdP servers 2a, 2b, and 2c, and multiple user terminals 3a, 3b, and 3c are communicably connected with each other via a public network such as the Internet and a telephone network etc.

In the description below, the service providing servers 1a, 1b, and 1c are collectively referred to as the service providing server 1 if it is unnecessary to distinguish the service providing servers respectively, the IdP servers 2a, 2b, and 2c are collectively referred to as the IdP server 2 if it is unnecessary to distinguish the IdP servers respectively, and the user terminals 3a, 3b, and 3c are collectively referred to as the user terminal 3 if it is unnecessary to distinguish the user terminals respectively.

The service providing server 1 (the service providing apparatus) is a server that provides services for users via the network such as a printing service, web storage service, and net mail-order service (i.e., cloud service). The service providing server 1 may be used from the user terminal 3 operated by general public via the public network 4.

The IdP server 2 (the login information issuing apparatus) is a server that may provide a service (IdP) that a user ID that the IdP server 2 itself issues, as typified by OAuth and Open ID Connect (OIDC) etc. utilized in SNSs mainly, may be used by other cloud services. The IdP server 2 described above may be used from the user terminal 3 operated by general public via the public network 4.

The user terminal 3 is a terminal operated by a user that may access the service providing server 1 and the IdP server 2 via the public network 4. The user terminal 3 may be implemented by a personal computer (PC), smartphone, tablet device, feature phone, and a liquid crystal display television including a network function etc.

The service providing system in this embodiment is described above.

The service providing system configured as described above allows a user to log in the user terminal 3 by inputting authentication information such as a user ID and password into the IdP server 2. In this case, the IdP server 2 issues login information to the user terminal 3 that logs in the IdP server 2. Subsequently, the user terminal 3 receives the login information from the IdP server 2 logged in by the user terminal 3 and transfers the login information being received to the service providing server 1 that provides a service to be used.

After that, after receiving the login information from the user terminal 3, based on the login information being received, the service providing server 1 acquires user information from the IdP server 2 that issued the login information and determines a profile based on the user information being acquired. Next, the service providing server 1 commands the user terminal 3 that transfers the login information to display a home screen applying the profile being determined.

The service providing system described above, in this embodiment, allows a user to select a profile to be used easily while preventing the user from selecting a profile different from the intended profile by mistake. With the service providing system in this embodiment, user convenience of the IdP using service is enhanced.

Figure 2:
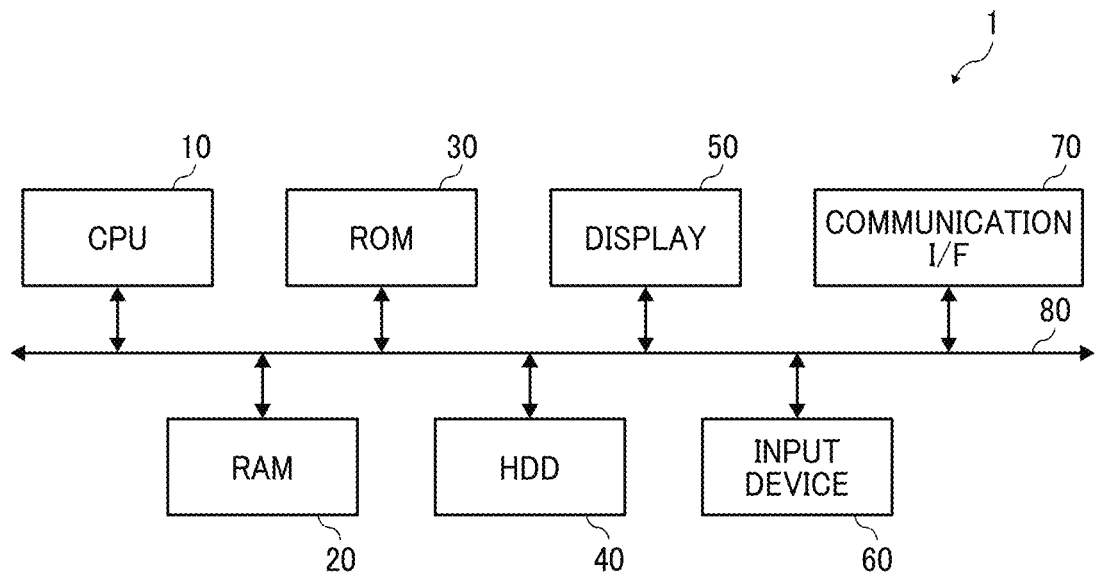
FIG. 2 is a block diagram illustrating a hardware configuration of a service providing server as an embodiment of the present invention.

Next, a hardware configuration of the service providing server 1, the IdP server 2, and the user terminal 3 in this embodiment is described below with reference to FIG. 2. FIG. 2 is a block diagram illustrating a hardware configuration of the service providing server 1 in this embodiment.

In FIG. 2, the hardware configuration of the service providing server 1 is illustrated as an example. However, the hardware configuration of the IdP server 2 and the user terminal 3 are similar to the hardware configuration of the service providing server 1.

As illustrated in FIG. 2, the service providing server 1 in this embodiment includes a central processing unit (CPU) 10, a random access memory (RAM) 20, a read only memory (ROM) 30, a hard disk drive (HDD) 40, a display 50, an input device 60, and a communication I/F 70 connected with each other via a bus 80.

The CPU 10 serves as a computation unit, and controls the entire operation of the service providing server 1. The RAM 20 is a volatile memory that can read or write information at high speed and is used as a work area when the CPU 10 processes information. The ROM 30 is a read-only nonvolatile storage medium, which stores programs such as firmware.

The HDD 40 is a readable/writable nonvolatile memory in which various kinds of data, an operating system (OS), various kinds of control programs, or various kinds of programs such as an application program are stored.

The display 50 is a visual user interface for checking a status of the service providing server 1 and implemented by a display device such as a liquid crystal display (LCD) and an output device such as a light emitting diode (LED) etc.

The input device 60 is a user interface to input data to the service providing server 1 and is implemented by input devices such as a keyboard, a mouse, an input button, and a touch panel etc. The communication I/F 70 is an interface that the service providing server 1 communicates with another apparatus.

In this hardware configuration described above, programs stored in storage devices such as the ROM 30 and HDD 40 are read to the RAM 20, and a software controlling unit is constructed by executing operation in accordance with the loaded programs by the CPU 10. Functional blocks that implement capabilities of the service providing server 1 of this embodiment are constructed by a combination of the software controlling units described above and hardware.

The hardware configuration of the service providing server 1, the IdP server 2, and the user terminal 3 in this embodiment is described above.

Figures 3, 4:
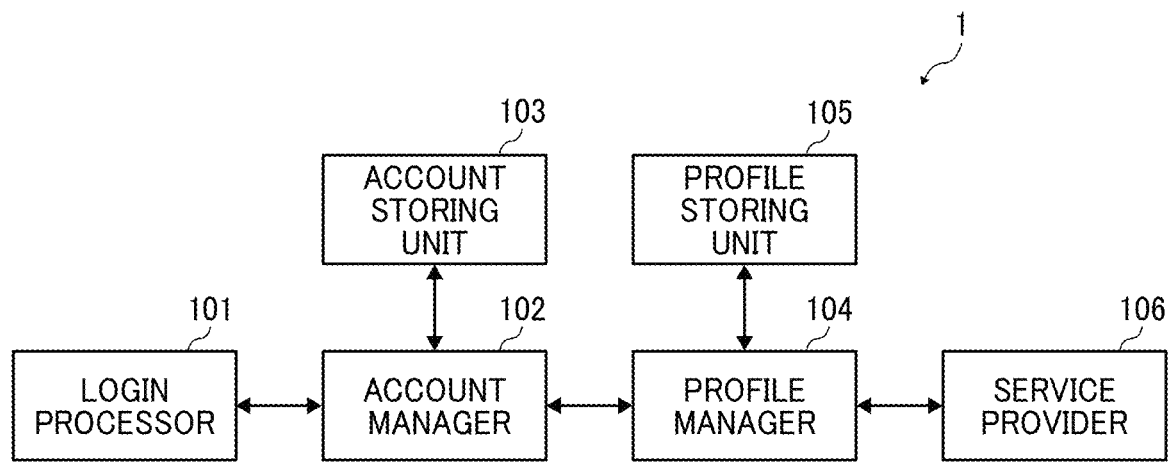
FIG. 3 is a block diagram illustrating a functional configuration of a service providing server as an embodiment of the present invention.
FIG. 4 is a diagram illustrating a data structure of user information as an embodiment of the present invention.

Next, a functional configuration of the service providing server 1 in this embodiment is described below with reference to FIG. 3. FIG. 3 is a block diagram illustrating a functional configuration of the service providing server 1 in this embodiment.

As illustrated in FIG. 3, the service providing server 1 in this embodiment includes a login processor 101, an account manager 102, an account storing unit 103, a profile manager 104, a profile storing unit 105, and a service provider 106.

After the login processor 101 receives the login information issued by the IdP server 2 from the user terminal 3, based on the login information being received, the login processor 101 acquires user information from the IdP server 2 that issued the login information and determines a profile based on the user information being acquired.

Here, the user information is information generated by the IdP server 2 when the user logs in the IdP server 2 by using the user terminal 3, and, as illustrated in FIG. 4, attributed values regarding the login user are described in the user information. FIG. 4 is a diagram illustrating a data structure of user information in this embodiment.

The login information is information required when the service providing server 1 acquires the user information from the IdP server 2 that issued the login information. In some cases, the login information is a meaningless string, or the login information is a string that the user information is encrypted using some sort of method. Therefore, the service providing server 1 cannot acquire useful information from the login information itself.

As a result, the service providing server 1 receives the user information by inquiring of the IdP server 2 that issued that login information, or the service providing server 1 receives a public key provided by the IdP server 2 that issued the login information and decodes the login information into the user information using the public key.

The login processor 101 generates a login ID based on the user information being acquired as described above. For example, if the user information has a data structure illustrated in FIG. 4, the login processor 101 generates the login ID by combining the user ID (user identification information) included in the user information and the name of the IdP server 2 (apparatus identification information) as the source or creating a string by processing those strings using a hash function.

As a result, in this embodiment, the login ID remains the same as long as the combination of the IdP server 2 logged in by the user and the user ID is the same.

The account manager 102 manages an account. Here, the account is created so that the user may utilize the service that the service providing server 1 provides. It should be noted that an account ID for identifying an account uniquely is assigned to each account.

Figures 5, 6:
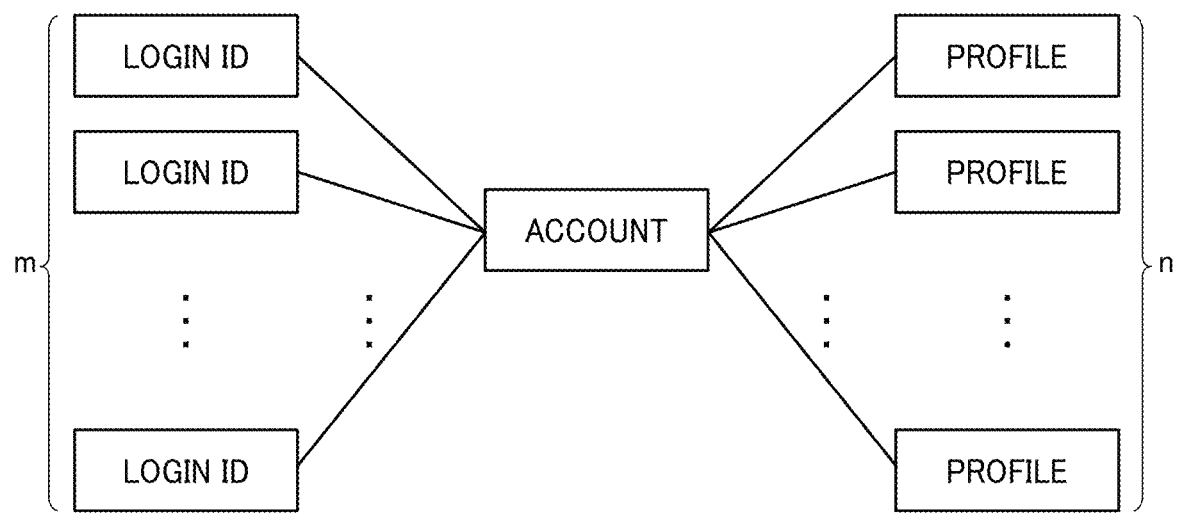
FIG. 5 is a diagram illustrating an operation of managing an account by an account manager as an embodiment of the present invention.
FIG. 6 is a diagram illustrating a data structure of a login ID management table stored in an account storing unit as an embodiment of the present invention.

As illustrated in FIG. 5, the account manager 102 manages the login ID associated with the profile via the account using a login ID management table and a profile ID management table (described later) stored in the account storing unit 103. FIG. 5 is a diagram illustrating an operation of managing an account by the account manager 102 in this embodiment.

Consequently, even if a user logs in the service providing server 1 using any user ID that the user created on various IdP servers 2, the account manager 102 may associate the user with the same account. In addition, if a user uses any one of the profiles, the account manager 102 (a setting information switcher and initial setting information manager) may switch the profile to other profile associated with the same account as the original profile.

The account storing unit 102 stores the login ID management table, profile ID management table, and default profile management table.

As illustrated in FIG. 6, the login ID management table is a table for managing the login ID and account ID associated with each other. FIG. 6 is a diagram illustrating a data structure of the login ID management table stored in the account storing unit 103 in this embodiment.

In a case illustrated in FIG. 6, login IDs "user1@IdP_A", "user2@IdP_C", and "user3@IdP_B" are associated with an account ID "1251". Likewise, in FIG. 6, login IDs "user4@IdP_C" and "user5@IdP_F" are associated with an account ID "1252".

As illustrated in FIG. 7, the profile ID management table is a table for managing the profile ID and the account ID associated with each other. FIG. 7 is a diagram illustrating a data structure of the profile ID management table stored in the account storing unit 103 in this embodiment.

In a case illustrated in FIG. 7, profile IDs "pf-1251-0001", "pf-1251-0002", and "pf-1251-0003" are associated with the account ID "1251". Likewise, in FIG. 7, login IDs "pf-1252-0001 and "pf-1252-0002" are associated with the account ID "1252".

As illustrated in FIG. 8, the default profile management table is a table for managing each login ID associated with a default (initial setting information) profile ID respectively. FIG. 8 is a diagram illustrating a data structure of the default profile ID management table stored in the account storing unit 103 in this embodiment.

In a case illustrated in FIG. 8, a default profile ID "pf-1251-0002" is associated with the login ID "user1@IdP_A". In FIG. 8, a default profile ID "pf-1251-0003" is associated with the login ID "user2@IdP_C".

In FIG. 8, a default profile ID "pf-1251-0001" is associated with the login ID "user2@IdP_B". In FIG. 8, a default profile ID "pf-1252-0002" is associated with the login ID "user4@IdP_C". In FIG. 8, a default profile ID "pf-1252-0001" is associated with the login ID "user5@IdP_F".

With reference to the default profile management table, the service providing server 1 may determine a profile firstly applied depending on the user ID used for login (i.e., the login ID). As a result, the profile to be applied is determined automatically depending on the user ID used for login (i.e., the login ID), and the profile may be switched to other profiles.

Since the user ID used for login may easily be associated with the profile as a user feeling, the profile is switched using the user ID used for login (i.e., the login ID).

The profile manager 104 manages a profile. As illustrated in FIG. 9, the profile (setting information) integrates information for specifying a user such as a setting for using the cloud service by the user, access authority, and the user's existence himself/herself on the network. Even if one attribute value is different from another attribute value, the number of created profile increases by just that much. FIG. 9 is a diagram illustrating a data structure of a profile managed by the profile manager 104 in this embodiment. The profile ID for identifying profile uniquely is assigned for each profile respectively.

The profile storing unit 105 stores the profile for each user as illustrated in FIG. 9. The service provider 106 performs an operation regarding the service that the service providing server 1 provides.

The functional configuration of the service providing server 1 in this embodiment is described above.

Figure 10:
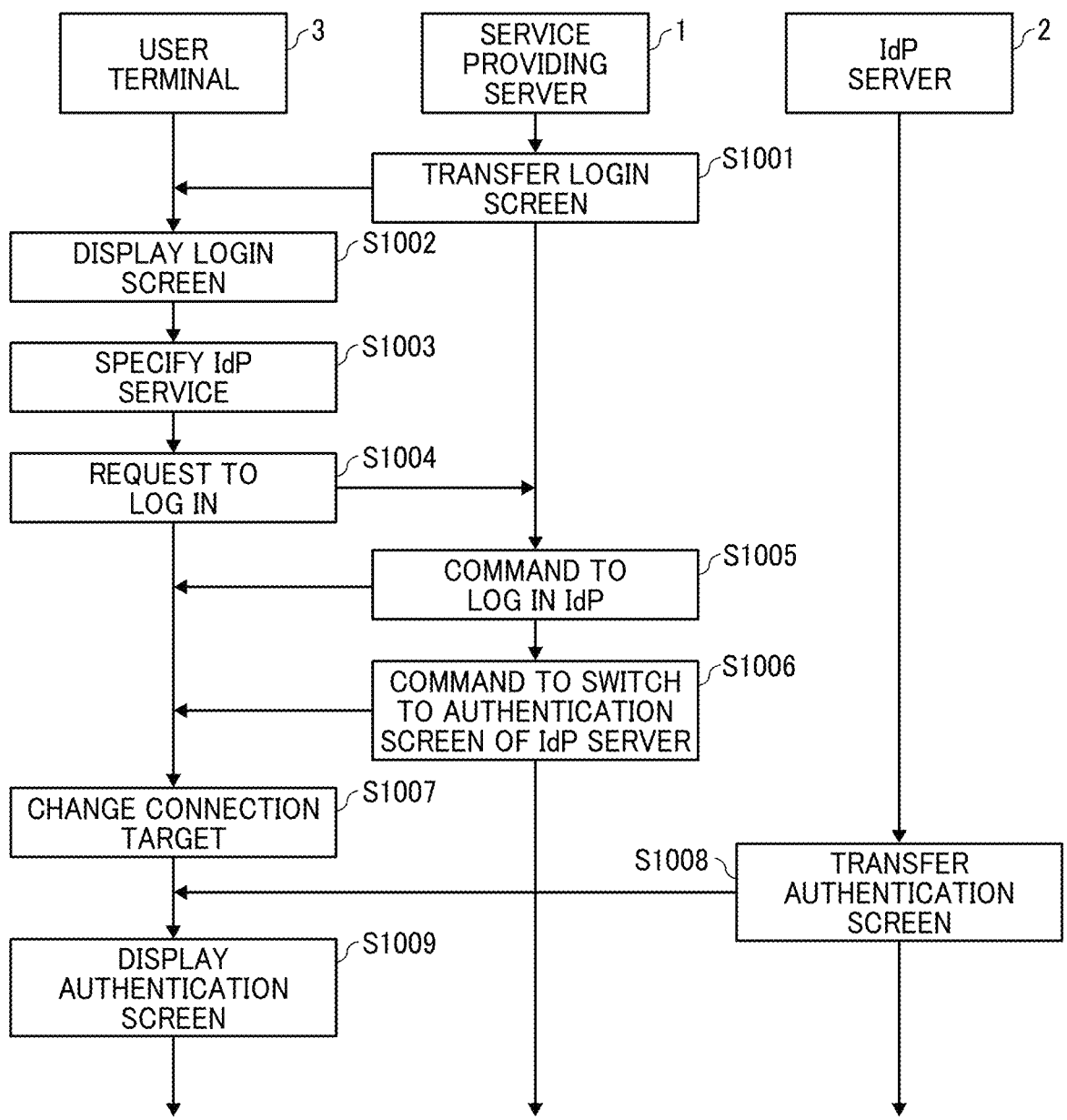
FIG. 10 is a sequence chart illustrating an operation that a service provided by the service providing server is used by a user terminal as an embodiment of the present invention.
Figure 11:
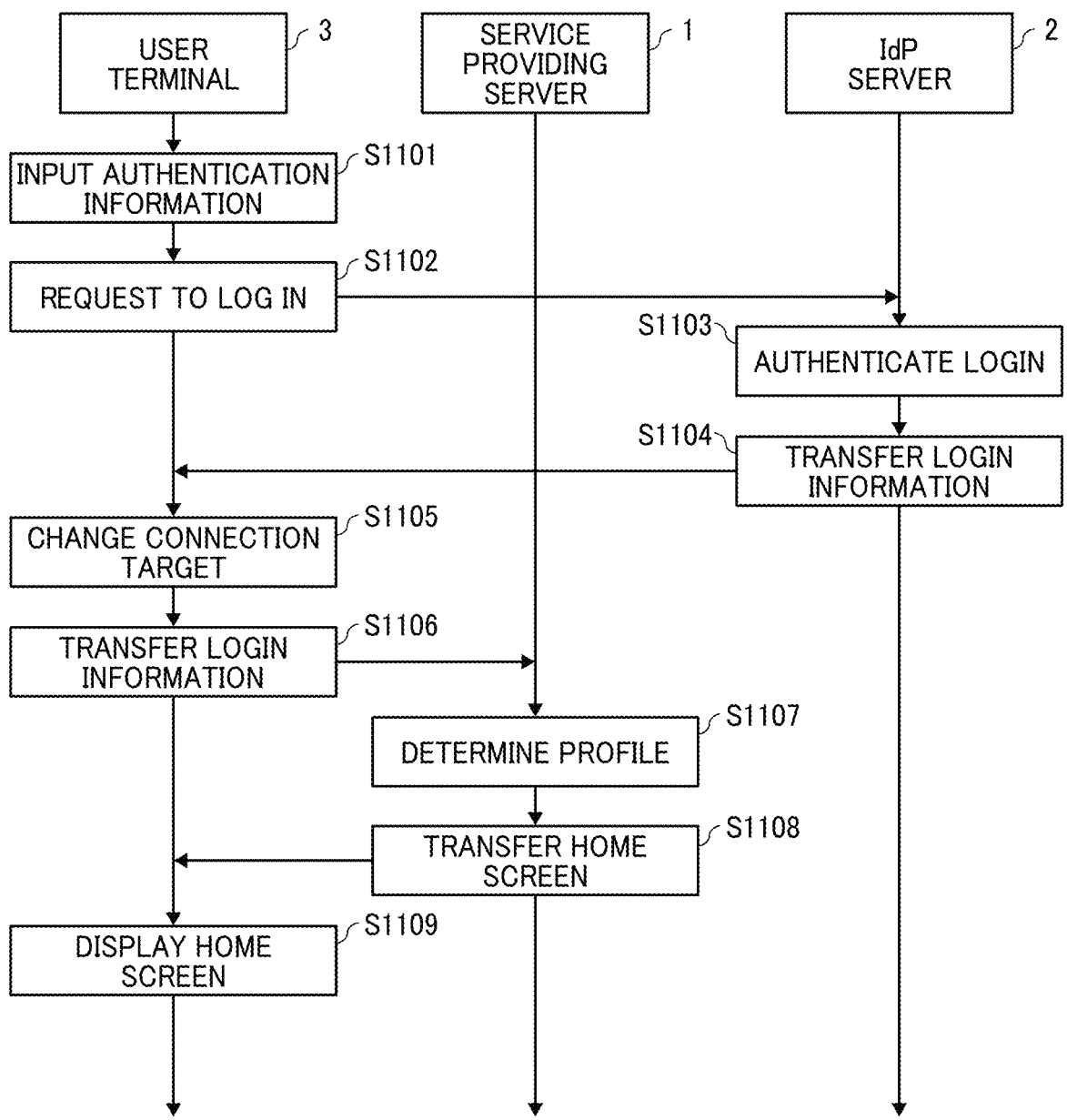
FIG. 11 is a sequence chart illustrating an operation that a service provided by the service providing server is used by a user terminal as an embodiment of the present invention.

Next, an operation that the service provided by the service providing server 1 is utilized on the user terminal 3 in the service providing system in this embodiment is described below with reference to FIGS. 10 and 11. FIGS. 10 and 11 are sequence charts illustrating an operation that a service provided by the service providing server 1 is used by a user terminal in this embodiment.

First, the service providing server 1 provides a login screen to the user terminal 3 that tries to utilize the service in S1001.

Next, the user terminal 3 displays the login screen provided by the service providing server 1 in S1002, specifies the IdP server 2 to be logged in accordance with user operation on the login screen in S1003, and requests the service providing server to log in S1004.

Figure 12:
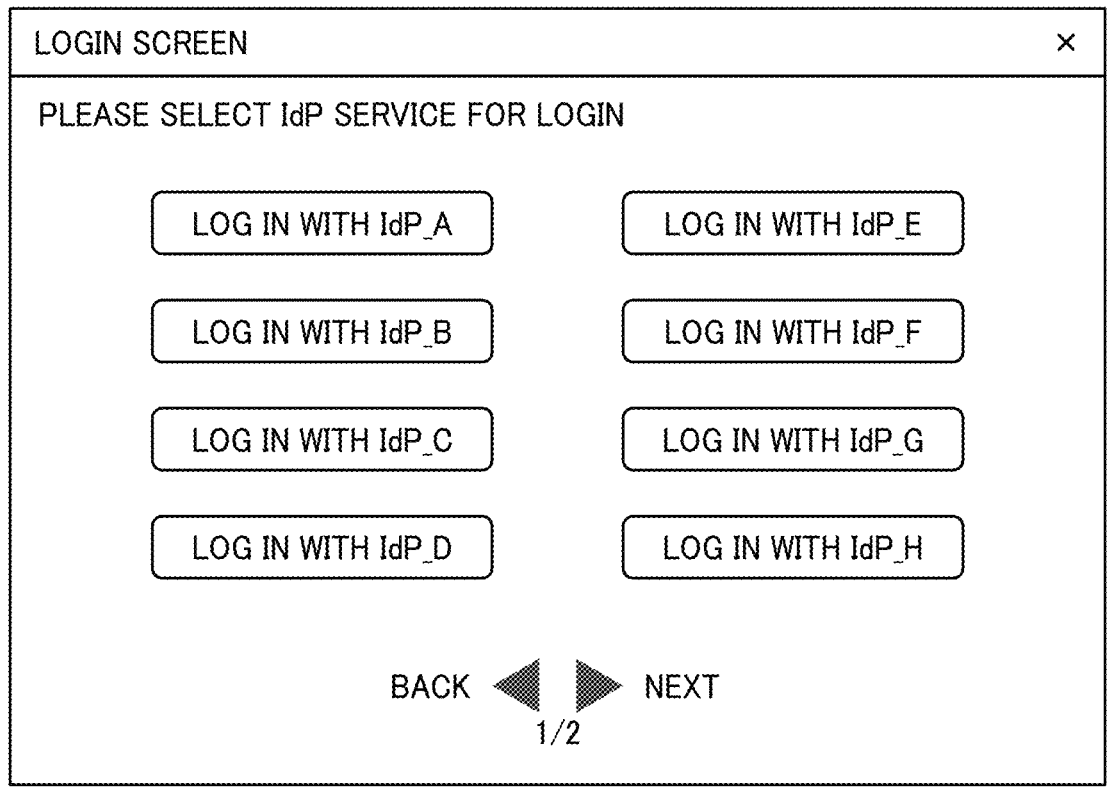
FIG. 12 is a diagram illustrating a login screen being displayed on the user terminal as an embodiment of the present invention.

Here, an example of the login screen displayed on the user terminal 3 is illustrated in FIG. 12. FIG. 12 is a diagram illustrating the login screen being displayed on the user terminal 3 in this embodiment. As illustrated in FIG. 12, the user requests to log in the service providing server 1 by specifying the IdP server 2 on the login screen.

After the request for login is issued from the user terminal 3, in S1005, the service providing server 1 commands to log in the IdP server 2 specified in S1003 and commands to switch a connecting destination of the user terminal 3 from the service providing server 1 into an authentication screen of the IdP server 2 to be logged in S1006. In this case, the service providing server 1 specifies a returning target. Consequently, after logging in the IdP server 2, the user terminal may switch the connecting destination into the service providing server 1 as the original connecting destination.

After being commanded to log in the IdP server 2 and switch to the authentication screen of the IdP server 2 to be logged in, the user terminal 3 switches the connecting destination to the authentication screen of the IdP server 2 to be logged in S1007. As a result, IdP server 2 provides the authentication screen to the user terminal 3 whose connecting destination is switched to the IdP server 2 itself in S1008.

Next, the user terminal 3 displays the authentication screen provided by the IdP server 2 in S1009, inputs authentication information such as the user ID and password etc. in accordance with user operation on the authentication screen in S1101, and commands to log in the IdP server 2 as the connecting destination in S1102.

After being requested to log in by the user terminal 3, the IdP server 2 authenticates the login user based on the authentication information being input in S1103. If the authentication succeeds, the IdP server 2 issues login information to the user terminal 3 as the origin that requests to log in S1104.

After receiving the login information from the IdP server 2, the user terminal 3 switches the connecting destination from the IdP server 2 into the service providing server 1 as the original connecting destination in S1105 and transfers the login information received from the IdP server 2 in S1106.

Subsequently, after receiving the login information from the user terminal 3, the service providing server 1 determines the profile to be applied based on the login information being received in S1107 and provides the home screen applying the profile to the user terminal 3 in S1108.

Next, the user terminal 3 displays the home screen provided by the service providing server 1 in S1109 and utilizes the service provided by the service providing server 1.

The operation that the service provided by the service providing server 1 is utilized on the user terminal 3 in the service providing system in this embodiment is described above.

Figure 13:
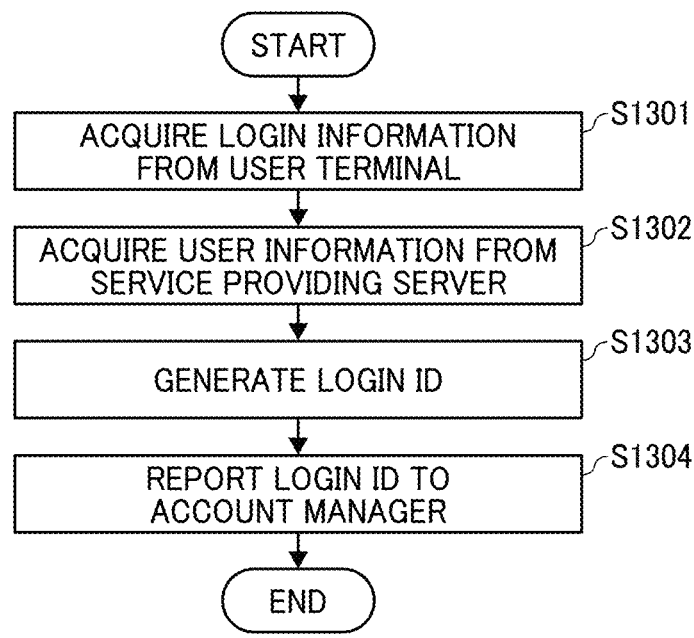
FIG. 13 is a flowchart illustrating an operation that the service providing server determines the profile as an embodiment of the present invention.
Figure 14:
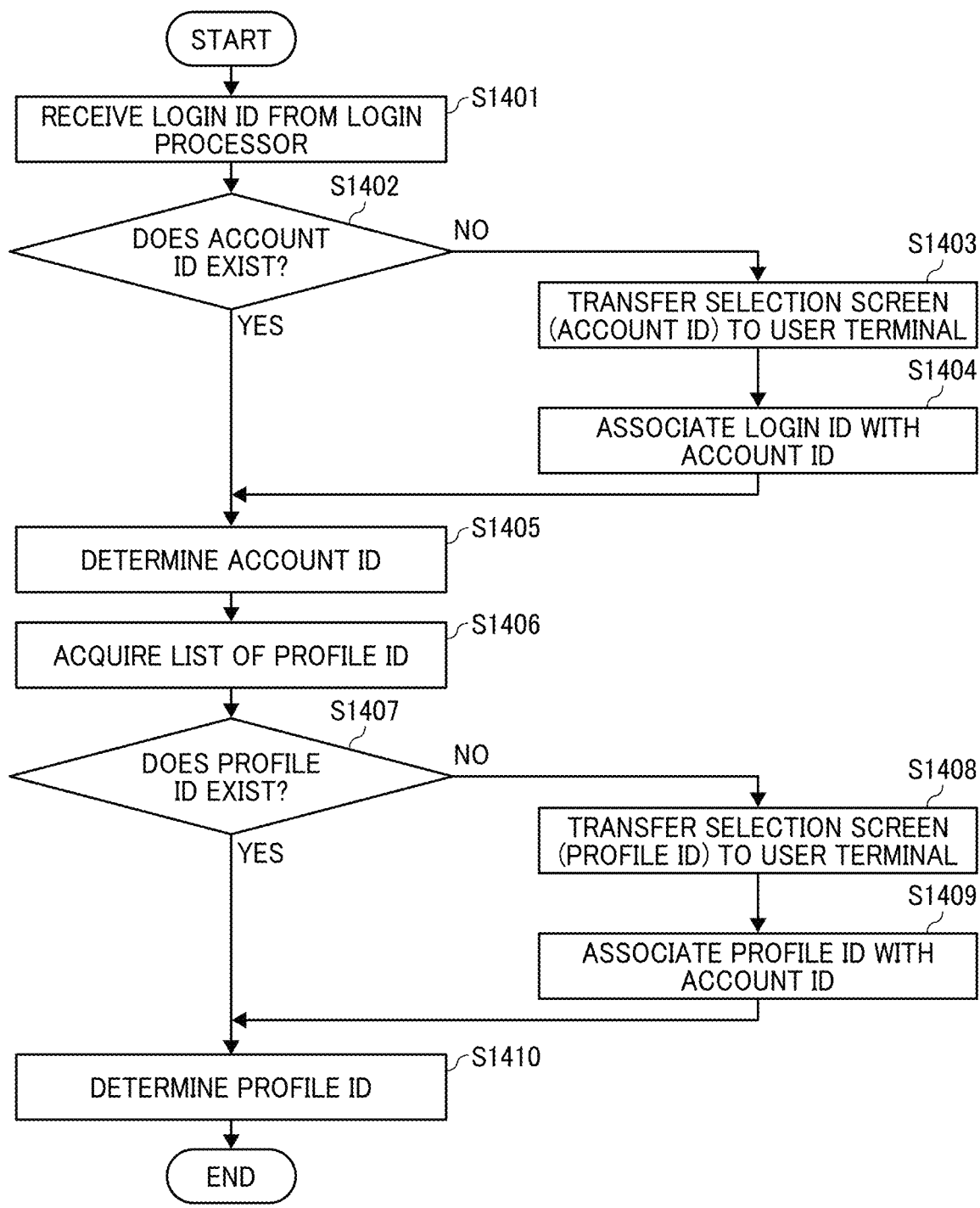
FIG. 14 is a flowchart illustrating an operation that the service providing server determines the profile as an embodiment of the present invention.

Next, an operation that the service providing server 1 determines the profile (i.e., the operation in S1107 in FIG. 11) in this embodiment is described below with reference to FIGS. 13 and 14. FIGS. 13 and 14 are flowcharts illustrating an operation that the service providing server 1 determines the profile in this embodiment.

First, after receiving the login information from the user terminal 3 in S1301, the login processor 101 receives the user information from the service providing server 1 based on the login information being received in S1302.

Next, the login processor 101 generates the login ID based on the user information being received in S1303 and reports the login ID being generated to the account manager 102 in S1304.

Next, after receiving the login ID from the login processor 101 in S1401, with reference to the login ID management table (illustrated in FIG. 6) stored in the account storing unit 103, the account manager 102 determines whether or not the account ID associated with the login ID being received exists in S1402.

In the determining operation in S1402, if the account manager 102 determines that the account ID associated with the login ID received in S1401 does not exist (NO in S1402), the case indicates that it is the first login to the service providing system 1.

As a result, in this case, the account manager 102 provides a screen for asking the user to select whether a new account is created and associated with the login ID received in S1401 or a user is requested to log in using another user ID or log in another IdP server 2 and an account ID associated with the login ID is associated with the login ID received in S1401 (hereinafter referred to as "selection screen (account ID)") to the user terminal 3 in S1403.

An example of the selection screen (account ID) displayed on the user terminal 3 is illustrated in FIG. 15. FIG. 15 is a diagram illustrating a selection screen (account ID) being displayed on the user terminal 3 in this embodiment.

Next, the account manager 102 associates the login ID received in S1401 with the account ID received in S1401 using the method selected by the user terminal 3 between two methods described above in S1404 and determines the account ID as the account ID for the user account in S1405.

In the determining operation in S1402, if the account manager 102 determines that the account ID associated with the login ID received in S1401 exists (YES in S1402), the account manager 102 determines the account ID as the account ID for the user account in S1405.

After determining the account ID, with reference to the profile ID management table (illustrated in FIG. 7) stored in the account storing unit 103, in S1406, the account manager 102 acquires the list of the profile IDs associated with the account ID determined in S1405.

After acquiring the list of the profile IDs, with reference to the default profile management table (illustrated in FIG. 8) stored in the account storing unit 103, in S1407, the account manager 102 determines whether or not the profile ID associated with the login ID received in S1401 is included in the list of the profile IDs acquired in S1406.

That is, in this case, the account manager 102 determines whether or not the setting indicating which profile is applied to the login ID received in S1401 has already been configured.

In the determining operation in S1407, if the account manager 102 determines that the profile ID associated with the login ID received in S1401 is not included in the list of the profile IDs received in S1406 (NO in S1407), that indicates default profile has not been configured yet.

As a result, the account manager 102 provides a screen that requests the user to select whether a new profile is created and the profile ID is associated with the login ID received in S1401 or any one existing profile is selected and the profile ID is associated with the login ID received in S1401 (hereinafter referred to as "selection screen (profile ID)" to the user terminal 3 in S1408.

An example of the selection screen (profile ID) displayed on the user terminal 3 is illustrated in FIG. 16. FIG. 16 is a diagram illustrating a selection screen (profile ID) being displayed on the user terminal 3 in this embodiment.

It should be noted that, in this case, if no profile has been created yet, the account manager 102 may skip the selection screen (profile ID) and provides a profile creation screen to the user terminal 3.

Next, the account manager 102 associates the login ID received in S1401 with the profile ID received in S1401 using the method selected by the user terminal 3 between two methods described above in S1409 and determines the profile ID as the profile ID for the profile to be applied in S1410.

In the determining operation in S1407, if the account manager 102 determines that the profile ID associated with the login ID received in S1401 is included in the list of the profile IDs received in S1406 (YES in S1407), the account manager 102 determines the profile ID as the profile ID for the profile to be applied in S1410.

The operation that the profile is determined by the service providing server 1 in the service providing system in this embodiment is described above.

As described above, by storing the login ID management table (illustrated in FIG. 6) and the profile ID management table (illustrated in FIG. 7), as illustrated in FIG. 5, the service providing server 1 in this embodiment manages the login ID and the profile ID associated with each account. In addition, by storing the default profile management table (illustrated in FIG. 8), the service providing server 1 in this embodiment may determine which profile is to be applied in case of logging in using an arbitrary user ID.

As a result, the service providing server 1 in this embodiment may easily select the profile that the user intends to use and prevent the user from selecting a profile different from the profile that the user intends to use by mistake. As a result, in the service providing system in this embodiment, it is possible to enhance user convenience of the IdP using service.

It should be noted that, after providing the home screen that the default profile is applied to the user terminal 3, the service providing server 1 in this embodiment may switch to another profile. For example, as illustrated in FIG. 17, the service providing server 1 in this embodiment provides a profile switching screen to the user terminal 3 so that a list of switchable profiles is displayed using a drop-down list and the user may select a profile to be applied. FIG. 17 is a diagram illustrating a profile switching screen being displayed on the user terminal 3 in this embodiment.

However, in some cases, depending on the user ID used for login, a profile that is not intended to be made switchable by the user may exist. For example, in some case, in case of logging in using a login ID for business purpose, the user may intend to prevent from switching to a profile for private purpose by mistake.

To cope with this issue, for each account ID, the service providing server 1 in this embodiment may be configured so that a list of profile IDs to be able to be switched for a login ID is set.

To implement the operation, the service providing server 1 in this embodiment stores a switchable profile management table illustrated in FIG. 18 in the account storing unit 103. FIG. 18 is a diagram illustrating a data structure of a switchable profile management table stored in the account storing unit 103 in this embodiment. As illustrated in FIG. 18, the switchable profile management table is a table for managing the login ID and the profile ID of the switchable profile associated with each other.

In FIG. 18, regarding an account ID "1251", in case of logging in using a login ID "user1@IdP_A", the system allows a user to switch to profiles "pf-1251-0001", "pf-1251-0002", and "pf-1251-0003".

In addition, regarding the account ID "1251", in case of logging in using a login ID "user2@IdP_C", while the system allows a user to switch to a profile "pf-1251-0003", it is impossible to switch to profiles "pf-1251-0002", and "pf-1251-0003".

In addition, regarding the account ID "1251", in case of logging in using a login ID "user3@IdP_B", while the system allows a user to switch to a profile "pf-1251-0003", it is impossible to switch to profiles "pf-1251-0002", and "pf-1251-0003".

Regarding an account ID "1252", in case of logging in using a login ID "user4@IdP_C", the system allows a user to switch to profiles "pf-1251-0001" and "pf-1251-0002".

In addition, regarding the account ID "1252", in case of logging in using a login ID "user5@IdP_F", while the system allows a user to switch to a profile "pf-1251-0001", it is impossible to switch to the profile "pf-1251-0002".

In the embodiment described above, the service providing system that may enhance user convenience for the IdP using service is provided.

The present invention also encompasses a non-transitory recording medium storing a program that executes a service providing method, performed by a service providing system that includes a service providing apparatus. The service providing method, performed by the service providing system, includes the steps of obtaining login information that is published when a user logs in, the login information to be used for providing service to the user, managing the login information being published and setting information used when the user utilizes the service being provided, associated with an account created for the user to utilize the service being provided, and managing the login information being published associated with default setting information, the default setting information being the setting information that is firstly applied when the user utilizes the service based on the login information being published.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A service providing system, comprising:
a login information publishing apparatus including first processing circuitry configured to publish login information when a user logs in the login information publishing apparatus via a terminal such that the login information is provided to the terminal, and to generate user identification information, the login information issued by the login information publishing apparatus usable to subsequently acquire the user identification information, and
a service providing apparatus including second processing circuitry configured to provide a service to the user based on the login information by,
receiving the login information from the terminal such that the terminal relays the login information provided by the login information publishing apparatus to the service providing apparatus when the user logs in the login information publishing apparatus,
acquiring the user identification information from the login information publishing apparatus that published the login information,
generating a login ID based on the user identification information and an identity of the login information publishing apparatus,
managing an account created for the user to utilize the service such that the account is associated with both a plurality of user IDs and a plurality of profiles included in the setting information such that each of the plurality of profiles associated with the account provide a same one of the service with user attribute values determined based on which one of the plurality of profiles is applied,
reading, from a memory, which of the plurality of profiles is indicated as a default profile for a current user ID of the plurality of user IDs associated with the account and generated based on the user identification information such that the service providing apparatus determines the default profile based on the user identification information acquired from the login information publishing apparatus,
automatically applying the default profile from amongst the plurality of profiles associated with the current user ID and providing the service by applying the user attribute values based on the default profile, and
displaying a screen to allow the user to switch from the default profile to another one of the plurality of profiles associated with the account created for the user.

2. The service providing system according to claim 1, wherein the second processing circuitry is further configured to generate the login ID such that the login ID is unique.

3. The service providing system according to claim 2, wherein the second processing circuitry is further configured to generate the login ID based on apparatus identification information for identifying the login information publishing apparatus that the user logs in and the user identification information for identifying the user who logs in the login information publishing apparatus.

4. The service providing system according to claim 1, wherein, when the account associated with the login information does not exist, the second processing circuitry is further configured to enable the user to,
  create another account associated with the login information; and
  login with different login information associated with a different account created for the user.

5. The service providing system according to claim 1, wherein, when the default profile associated with the login information does not exist, the second processing circuitry is further configured to enable the user to,
  add a new profile to the plurality of profiles included in the setting information as the default profile associated with the login information; and
  select an existing one of the plurality of profiles included in the setting information associated with the account as the default profile associated with login information.

6. The service providing system according to claim 1, wherein the second processing circuitry is further configured to switch, after the user logs in the login information publishing apparatus and the service becomes available, from the default profile to other of the plurality of profiles included in the setting information associated with the account.

7. The service providing system according to claim 6, wherein the second processing circuitry is further configured to control whether the user can switch from a current profile of the plurality of profiles to a new profile of the plurality of profiles.

8. A service providing apparatus, comprising:
processing circuitry configured to,
  receive login information from a terminal that is published to the terminal by a login information publishing apparatus when a user logs in to the login information publishing apparatus such that the terminal relays the login information provided by the login information publishing apparatus to the service providing apparatus when the user logs in the login information publishing apparatus, the login information issued by the login information publishing apparatus usable to subsequently acquire user identification information generated by the login information publishing apparatus, the login information usable to provide a service to the user;
  acquire the user identification information from the login information publishing apparatus that published the login information,
  generate a login ID based on the user identification information and an identity of the login information publishing apparatus,
  manage an account created for the user to utilize the service such that the account is associated with both a plurality of user IDs and a plurality of profiles included in the setting information such that each of the plurality of profiles associated with the account provides a same one of the service with user attribute values determined based on which one of the plurality of profiles is applied;
  read, from a memory, which of the plurality of profiles is indicated as a default profile for a current user ID of the plurality of user IDs associated with the account and generated based on the user identification information such that the service providing apparatus determines the default profile based on the user identification information acquired from the login information publishing apparatus;
  automatically apply the default profile from amongst the plurality of profiles associated with the current user ID and providing the service by applying the user attribute values based on the default profile information; and
  display a screen to allow the user to switch from the default profile to another one of the plurality of profiles associated with the account created for the user.

9. A service providing method, the method comprising:
  receiving login information from a terminal that is published to the terminal by a login information publishing apparatus when a user logs in to the login information publishing apparatus such that the terminal relays the login information provided by the login information publishing apparatus to the service providing apparatus when the user logs in the login information publishing apparatus, the login information issued by the login information publishing apparatus usable to subsequently acquire user identification information generated by the login information publishing apparatus, the login information to be used for providing a service to the user;
  acquiring the user identification information from the login information publishing apparatus that published the login information;
  generating a login ID based on the user identification information and an identity of the login information publishing apparatus,
  managing an account created for the user to utilize the service such that the account is associated with both a plurality of user IDs and a plurality of profiles included in the setting information such that each of the plurality of profiles associated with the account provides a same one of the service with user attribute values determined based on which one of the plurality of profiles is applied;
  reading, from a memory, which of the plurality of profiles is indicated as a default profile for a current user ID of the plurality of user IDs associated with the account and generated based on the user identification information such that the service providing apparatus determines the default profile based on the user identification information acquired from the login information publishing apparatus;
  automatically applying the default profile from amongst the plurality of profiles associated with the current user ID and providing the service by applying the user attribute values based on the default profile; and
  displaying a screen to allow the user to switch from the default profile to another one of the plurality of profiles associated with the account created for the user.

10. The service providing system according to claim 1, wherein the service providing apparatus is one of a plurality of service providing apparatuses, and
  the login information publishing apparatus is configured as an identity provider (idP) service to allow the user to use single sign-on (SSO) to access each of the plurality of service providing apparatuses.

11. The service providing system according to claim 1, wherein the service provided by the service providing apparatus is a printing service provided based on the login information.

12. The service providing system of claim 1, wherein the service providing apparatus is configured to automatically apply the default profile and provide the service when the user logs in the login information publishing apparatus, and to switch from the default profile to another one of the plurality of profiles included in the setting information associated with the account in response to a switch request from the user.

13. The service providing system of claim 7, wherein the second processing circuitry is configured to control whether the user can switch from the current profile to the new profile by determining whether the new profile is included in list of allowable profiles associated with the login information.

* * * * *